United States Patent
Hioki et al.

(10) Patent No.: US 7,954,403 B2
(45) Date of Patent: Jun. 7, 2011

(54) WORKPIECE CARRY-IN/OUT DEVICE FOR COMPOSITE WORKING LATHE

(75) Inventors: Ko Hioki, Aichi pref. (JP); Yasuhiro Goshima, Aichi pref. (JP); Masahiro Sugiura, Aichi pref. (JP); Toru Yamamoto, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 317 days.

(21) Appl. No.: 12/330,687

(22) Filed: Dec. 9, 2008

(65) Prior Publication Data

US 2009/0151524 A1 Jun. 18, 2009

(30) Foreign Application Priority Data

Dec. 12, 2007 (JP) ................. 2007-321130

(51) Int. Cl.
 *B23B 13/00* (2006.01)
 *B23Q 7/10* (2006.01)
(52) U.S. Cl. ............................. 82/125; 483/3
(58) Field of Classification Search .............. 82/125, 82/124, 126; 29/563, DIG. 56; 414/14; 483/3, 483/14
 See application file for complete search history.

(56) References Cited

U.S. PATENT DOCUMENTS

| | | | |
|---|---|---|---|
| 4,382,215 A * | 5/1983 | Barlow et al. ............ | 318/568.1 |
| 4,787,280 A | 11/1988 | Voelkerding | |
| 4,821,402 A * | 4/1989 | Kosho et al. ............ | 483/5 |
| 5,006,685 A * | 4/1991 | Hatano et al. ............ | 219/69.2 |
| 5,045,664 A * | 9/1991 | Nakagawa et al. ........ | 219/69.2 |
| 5,439,431 A * | 8/1995 | Hessbruggen et al. ...... | 483/14 |
| 5,649,887 A * | 7/1997 | Taki et al. ............... | 483/3 |
| 7,063,653 B2 * | 6/2006 | Horibe et al. ............ | 483/3 |
| 2005/0084354 A1 | 4/2005 | Feinauer et al. | |
| 2006/0270538 A1 * | 11/2006 | Komizo ................. | 483/3 |
| 2009/0053004 A1 * | 2/2009 | Yamaura et al. .......... | 409/165 |
| 2009/0075795 A1 * | 3/2009 | Okabe et al. ............ | 483/18 |
| 2009/0107310 A1 * | 4/2009 | Arisue et al. ............ | 82/120 |

FOREIGN PATENT DOCUMENTS

| | | |
|---|---|---|
| DE | 19633899 | 2/1998 |
| EP | 0254043 | 1/1988 |
| EP | 0 941 790 A1 | 9/1999 |
| EP | 0941790 | 9/1999 |
| JP | 06-055399 | 3/1994 |
| WO | 03/070407 | 8/2003 |

OTHER PUBLICATIONS

European Search Report for corresponding application No. 08405297.6 dated Apr. 7, 2009.
Office Action for corresponding Chinese Application No. 200810178872.1 dated Apr. 21, 2010.

* cited by examiner

*Primary Examiner* — Will Fridie, Jr.
(74) *Attorney, Agent, or Firm* — Renner, Otto, Boisselle & Sklar, LLP (57) ABSTRACT

The invention provides a device for automatically carrying in and out a workpiece cooperating with a tool spindle stock of a composite working lathe. The composite working lathe comprises a main spindle 10, a workpiece handling device 20 and a tool spindle stock 30 that rotates around a B axis. A workpiece carry-in/out device 100 comprises a frame 120 including a material carry-in hand 130 and a finished product tray 140, and a cylinder 110 for moving the frame back and forth. A door 60 of a cover 50 is opened to carry in a material $B_1$ and carry out a finished product $P_1$.

6 Claims, 14 Drawing Sheets

WORKPIECE CARRY-IN/OUT DEVICE FOR COMPOSITE WORKING LATHE

The present application is based on and claims priority of Japanese patent application No. 2007-321130 filed on Dec. 12, 2007, the entire contents of which are hereby incorporated by reference.

BACKGROUND OF THE INVENTION

1. Field of the Invention

The present invention relates to a carry-in/out device of a workpiece for a composite working lathe using a tool spindle stock.

2. Description of the Related Art

According to the prior art, robots are used to carry in materials automatically to a main spindle of a lathe and to carry out finished workpieces therefrom.

Further, Japanese patent application laid-open publication No. 06-55399 (patent document 1) discloses a device having a workpiece grip hand attached to a tool spindle via an automatic tool changing device so as to carry workpieces in and out.

The device disclosed in the above-mentioned publication relates to a device designed to machine a workpiece placed on a table.

SUMMARY OF THE INVENTION

The present invention provides a device combining a workpiece chuck hand attached to a tool spindle stock of a composite working lathe and a device for carrying materials and finished products into and out of the lathe.

In order to achieve the above object, the present invention provides a workpiece carry-in/out device for a composite working lathe comprising a main spindle for gripping and rotating a workpiece, a tool spindle stock that moves along a Z axis parallel to the axis line of the main spindle and an X axis orthogonal to the Z axis, and further rotates around a B axis perpendicular to a plane formed by the X axis and the Z axis, a tool magazine for supplying a machining tool and a workpiece chuck hand for gripping a workpiece to a tool spindle of the tool spindle stock in an exchangeable manner, and a cover for covering a machining area, wherein the workpiece carry-in/out device is disposed on an outer side of the cover on an opposite side from the main spindle of the composite working lathe.

Further, the workpiece carry-in/out device comprises upper and lower conveyers, a frame having a carry-in hand for gripping a material and a carry-out tray for receiving a finished product, and a cylinder for moving the frame back and forth between the conveyer and the machining area.

Moreover, the tool spindle stock having the workpiece chuck hand attached thereto receives a workpiece having completed a first step machining from the chuck on the main spindle, reverses the workpiece and returns the same to the chuck on the main spindle, and the composite working lathe further comprises a workpiece handling device disposed below the tool spindle stock and moving along an axis parallel to the Z axis, and the workpiece handling device includes a workpiece pressing device for pressing the workpiece onto the chuck on the main spindle.

Even further, the workpiece carry-in/out device further comprises a door for opening and closing an opening formed on a cover disposed between the composite working lathe and the workpiece carry-in/out device.

Moreover, the tool spindle stock turns a center line of grip of the workpiece chuck hand toward a perpendicular direction by rotating around a B axis to receive the material carried in via a carry-in hand and to carry out the finished product on the carry-out tray, and the workpiece carry-in/out device further comprises a finished product push-out cylinder for pushing the finished product on the carry-out tray onto a finished product conveyer.

In the present specification, the "center line of grip of the workpiece chuck hand" refers to the center line of the object gripped by the workpiece chuck hand, and for example, when the workpiece chuck hand grips an outer diameter of a cylindrical workpiece, the center line of grip corresponds to the center axis of the workpiece.

The present invention having the above-described arrangement enables to automatically carry a workpiece into and out of a composite working lathe without using an articulated robot or other robots.

DETAILED DESCRIPTION OF THE PREFERRED EMBODIMENTS

Figure 1:
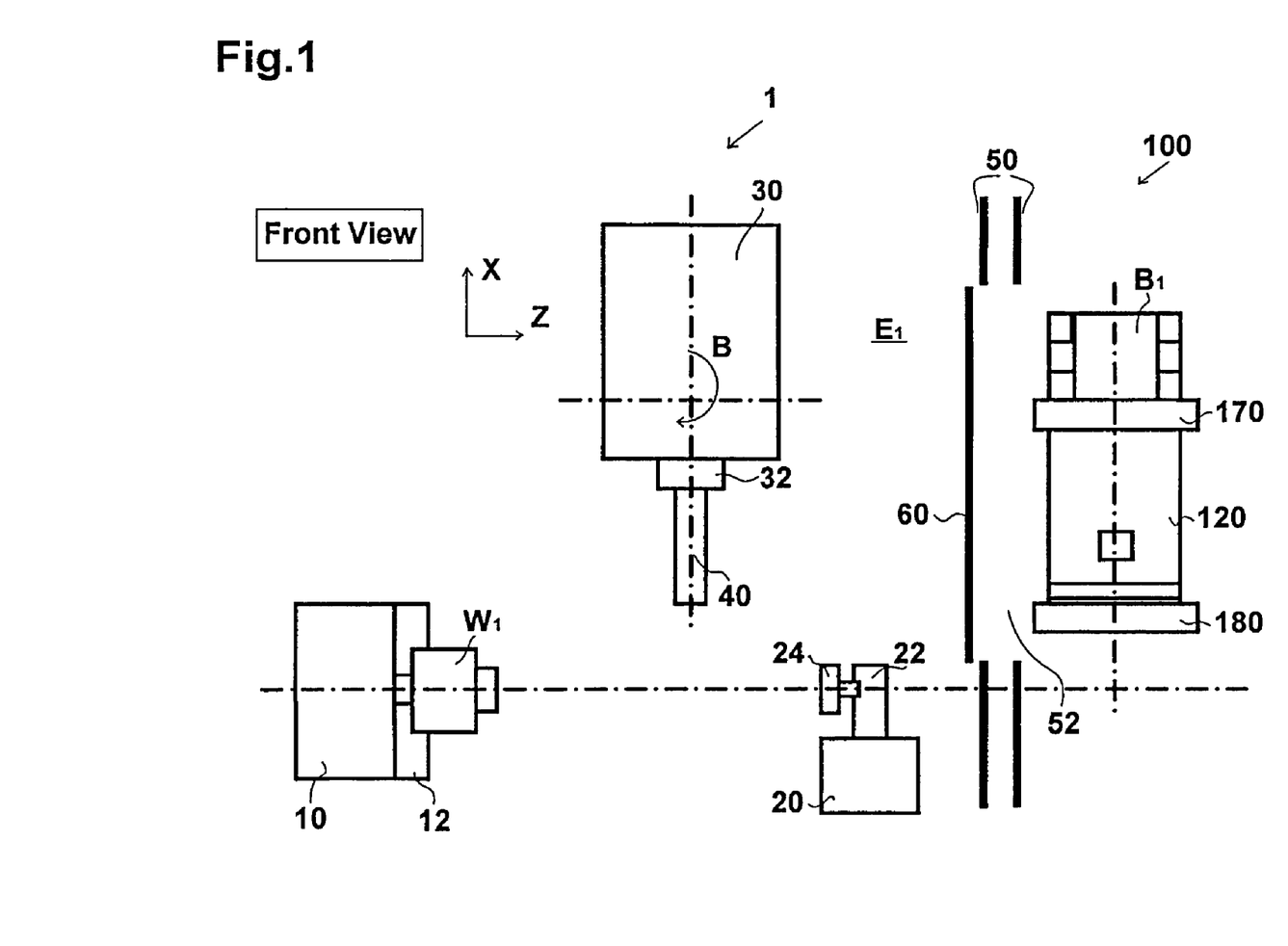
FIG. 1 is a front view of a workpiece carry-in/out device for a composite working lathe according to the present invention.
Figure 2:
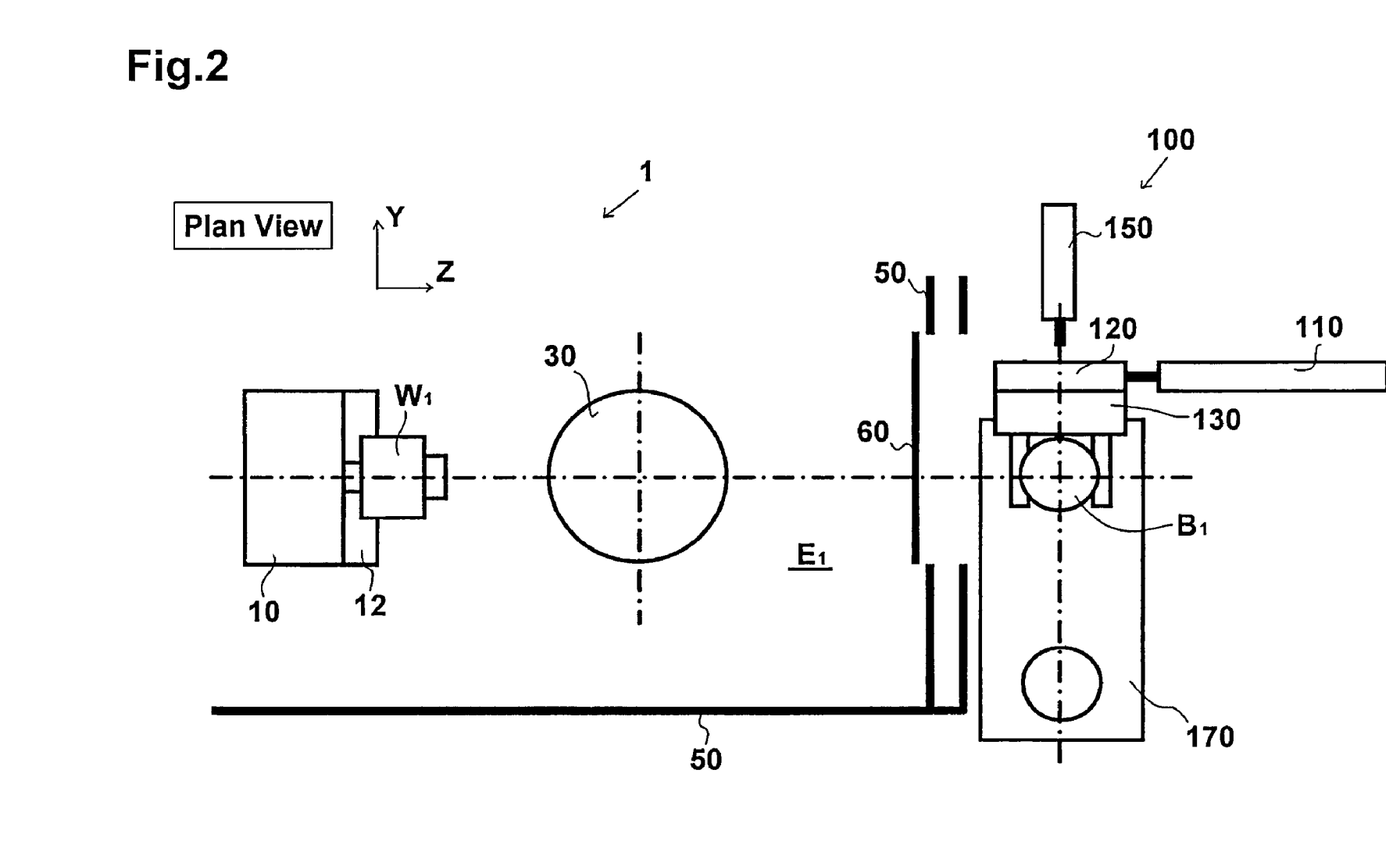
FIG. 2 is a plan view of the workpiece carry-in/out device for a composite working lathe according to the present invention.
Figure 3:
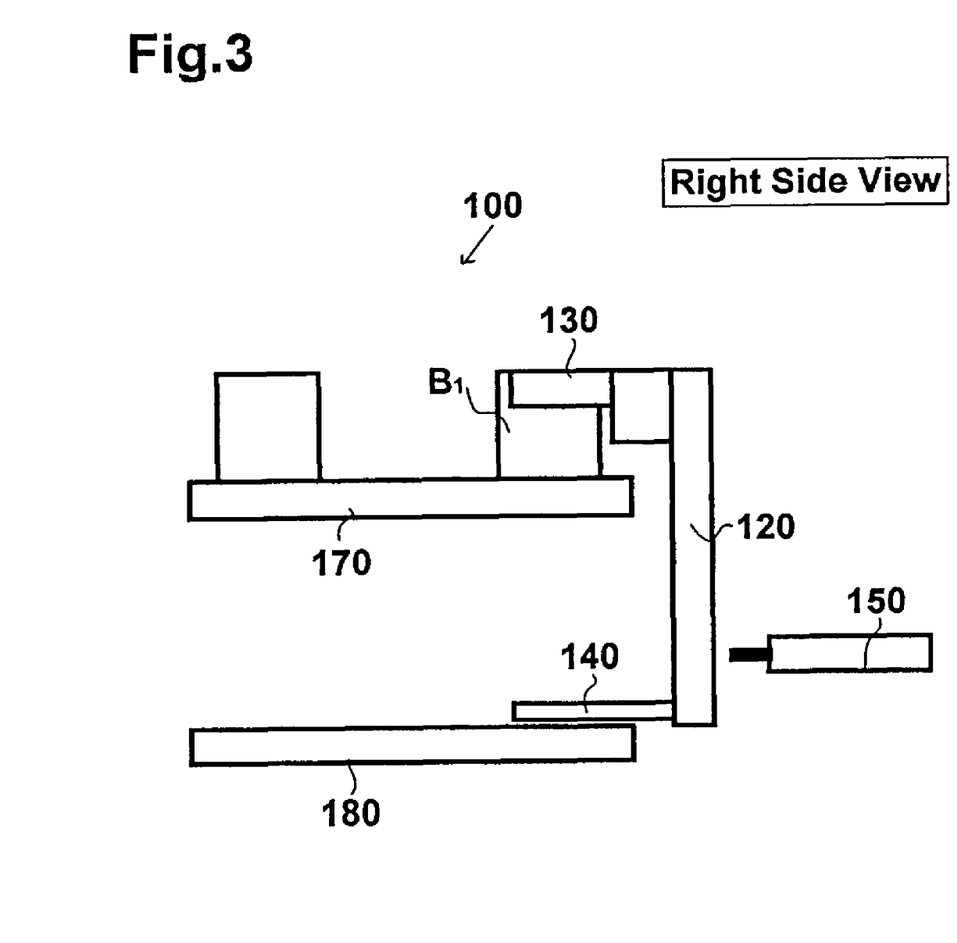
FIG. 3 is a right side view of the workpiece carry-in/out device for a composite working lathe according to the present invention.

FIG. 1 is a front view illustrating the outline of a workpiece carry-in/out device for a composite working lathe according to the present invention, FIG. 2 is a plan view thereof, and FIG. 3 is a right side view thereof.

A composite working lathe denoted as a whole by reference number 1 comprises, as major components, a main spindle 10 for gripping a workpiece, a tool spindle stock 30 capable of having various machining tools attached in exchangeable manner, and a workpiece handling device 20.

The tool spindle stock 30 moves along a Z axis parallel to the axis line of the main spindle 10, an X axis orthogonal to the Z axis, and a Y axis perpendicular to the plane formed by the X axis and the Z axis. Further, the tool spindle stock 30 is capable of rotating around a rotate shaft B parallel to the Y axis.

A workpiece handling device 20 is disposed below the tool spindle stock 30. The workpiece handling device 20 has a head 22 and a workpiece pressing device 24 attached to the head, and moves along an axis line parallel to the Z axis.

The circumference of the machining area $E_1$ formed of these major components is surrounded by a cover 50.

The composite working lathe has a tool magazine not shown, which supplies, in addition to various machining tools, a workpiece chuck hand for gripping a workpiece to the tool spindle of the tool spindle stock in an exchangeable manner.

According to the workpiece carry-in/out device for a composite working lathe of the present invention, an opening 56 is formed on a cover 50 at a right side portion of the main body, and a door 60 is provided to open and close the opening 52.

On the right side of the main body is arranged a workpiece carry-in/out device denoted as a whole by reference number 100.

The workpiece carry-in/out device 100 comprises a frame 120 having a carry-in hand 130 and a carry-out tray 140, and a cylinder 110 for moving the frame 120 into and out of the machining area $E_1$.

A workpiece carry-in hand 130 is disposed on the upper portion of the frame 120, and a workpiece carry-out tray 140 is disposed on the lower portion of the frame 120.

A material conveyer 170 is disposed below the workpiece carry-in hand 130, and a finished product conveyer 180 is disposed below the workpiece carry-out tray 140.

FIGS. 1 through 3 illustrate a state in which the first step of machining of a workpiece $W_1$ gripped by a chuck 12 on the main spindle 10 has been completed using a machining tool not shown attached to the tool spindle 32 on the tool spindle stock 30.

A workpiece chuck hand 40 prepared by the tool magazine is attached to the tool spindle 32 after the machining has been completed.

Figure 4A:
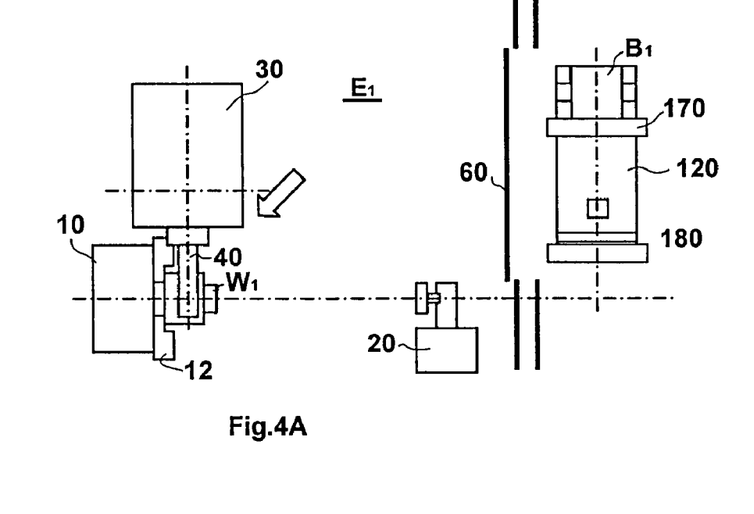
FIGS. 4A, 4B and 4C are explanatory views illustrating the operation of the workpiece carry-in/out device for a composite working lathe according to the present invention.
Figure 4B:
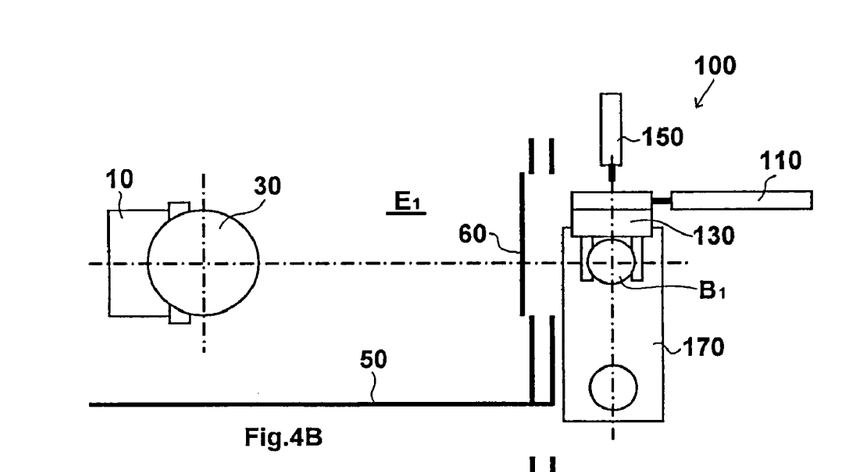
Figure 4C:
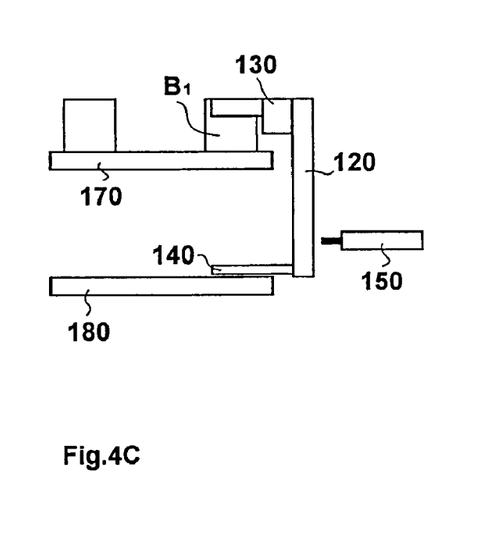

FIG. 4 and the following drawings illustrate states in which the first step of the machining of the workpiece $W_1$ has been completed.

FIGS. 4A, 4B, 4C through FIGS. 14A, 14B and 14C respectively show the front view, the plan view and the right side view of the workpiece carry-in/out device for a composite working lathe according to the present invention as illustrated in FIGS. 1, 2 and 3.

The tool spindle stock 30 is moved toward the chuck 12 of the main spindle 10, where a workpiece chuck hand 40 grips the workpiece $W_1$ and the chuck 12 is unclamped.

The workpiece carry-in/out device 100 is standing by at the exterior of the machine.

Figure 5A:
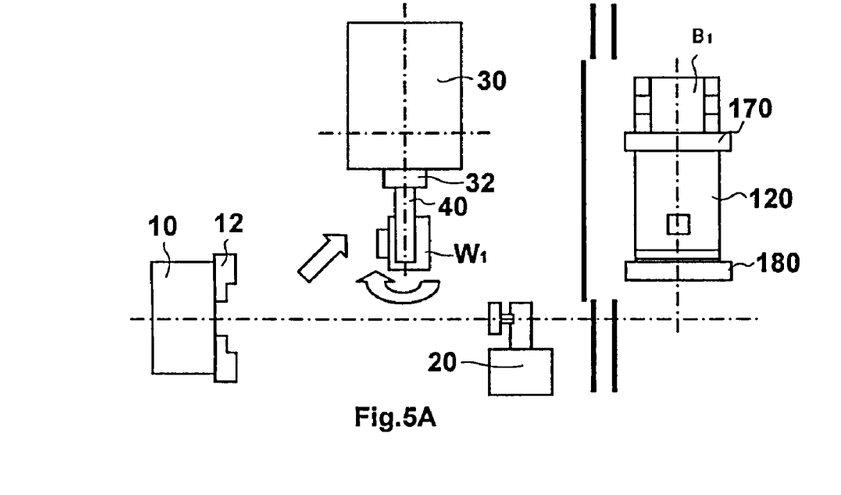
FIGS. 5A, 5B and 5C are explanatory views illustrating the operation of the workpiece carry-in/out device for a composite working lathe according to the present invention.
Figure 5B:
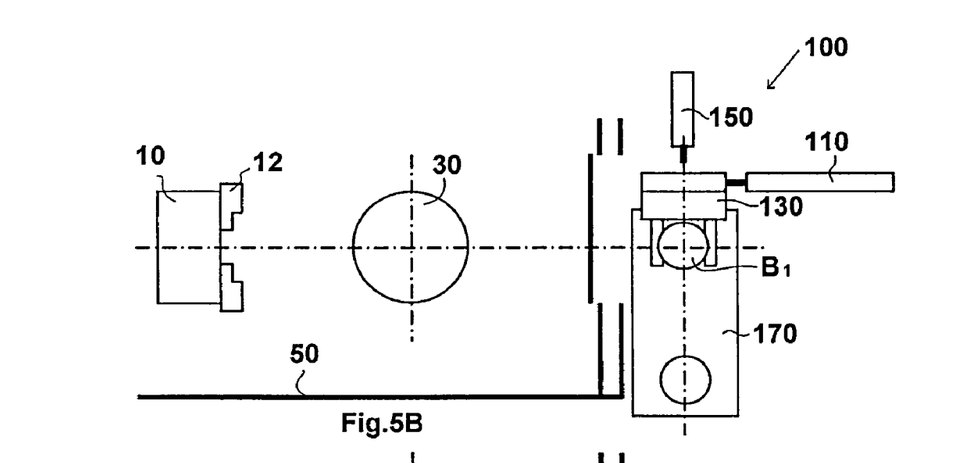
Figure 5C:
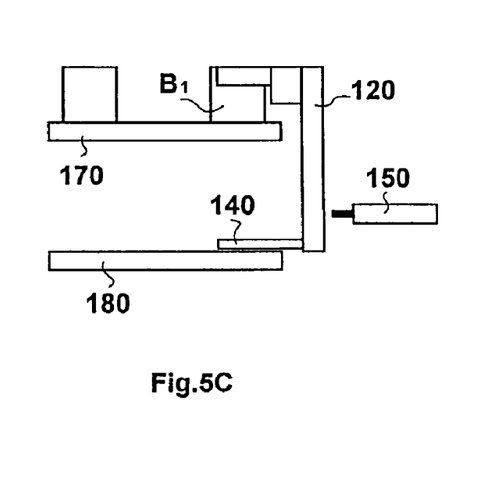

FIGS. 5A, 5B and 5C illustrate a step in which the tool spindle stock 30 is moved to the origin position and the workpiece chuck hand 40 rotates for 180 degrees around the axis line of the tool spindle 32 so as to reverse the workpiece.

Figure 6A:
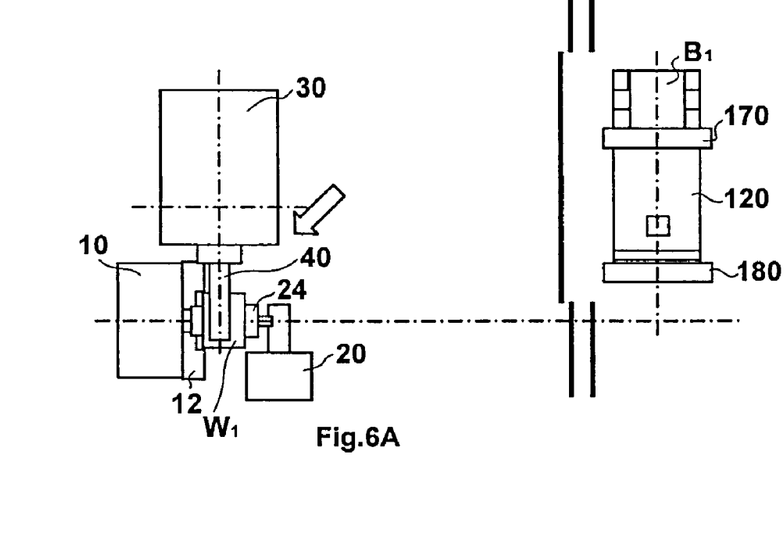
FIGS. 6A, 6B and 6C are explanatory views illustrating the operation of the workpiece carry-in/out device for a composite working lathe according to the present invention.
Figure 6B:
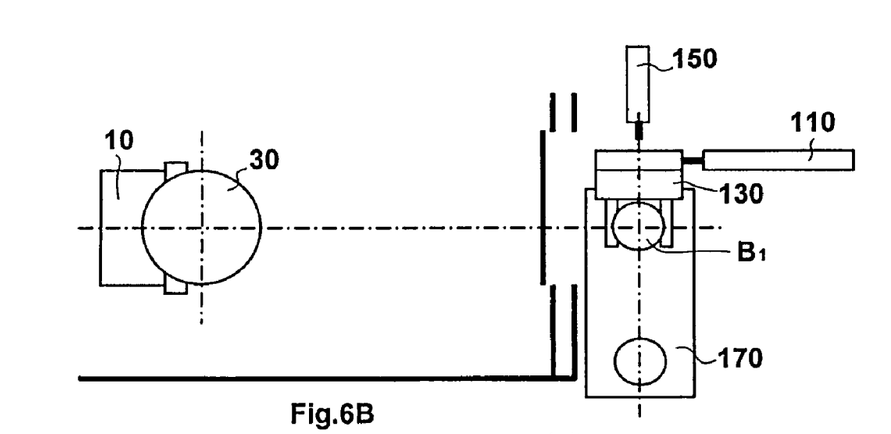
Figure 6C:
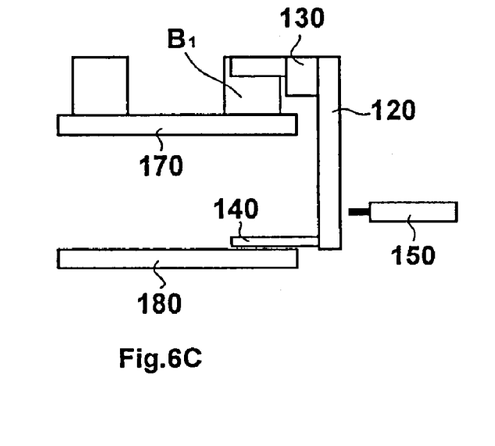

FIGS. 6A, 6B and 6C illustrate a step in which the tool spindle stock 30 is moved toward the chuck 12 of the main spindle 10 where the workpiece chuck hand 40 gripping the workpiece $W_1$ unclamps the workpiece $W_1$ and the chuck 12 of the main spindle 10 clamps the workpiece $W_1$. In this step, the workpiece handling device 20 moves toward the main spindle 10, and the workpiece pressing device 24 of the workpiece handling device 20 presses the workpiece $W_1$ against the chuck 12 so as to ensure the chucking of the workpiece.

Figure 7A:
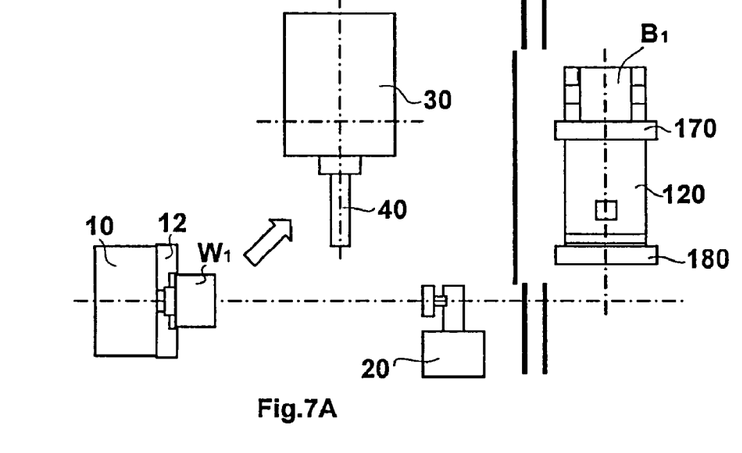
FIGS. 7A, 7B and 7C are explanatory views illustrating the operation of the workpiece carry-in/out device for a composite working lathe according to the present invention.
Figure 7B:
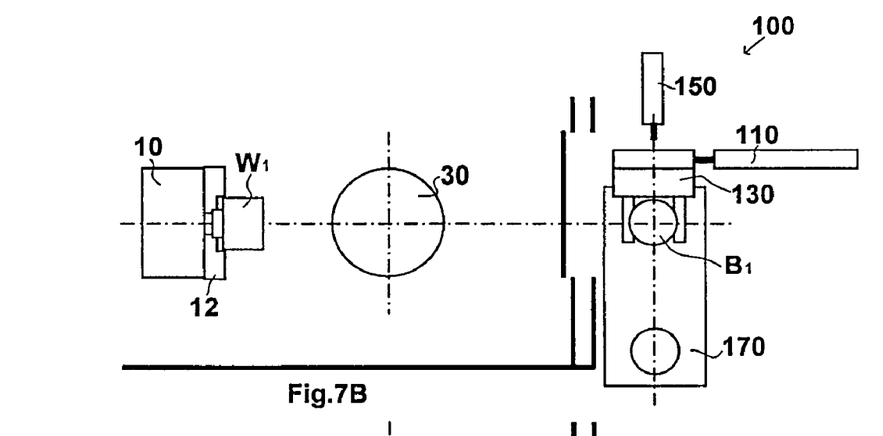
Figure 7C:
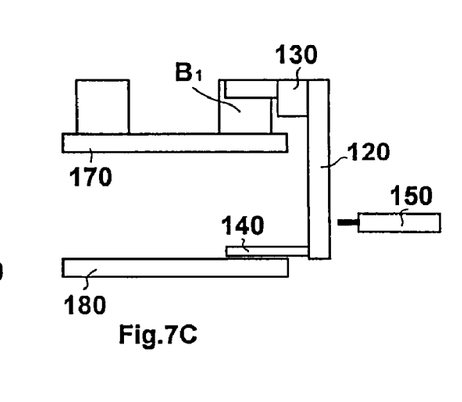

FIGS. 7A, 7B and 7C illustrate a state in which the tool spindle stock 30 is returned to the origin position and the workpiece handling device 20 has been retreated.

The workpiece chuck hand 40 on the tool spindle of the tool spindle stock 30 is replaced with a machining tool, by which the workpiece $W_1$ is subjected to a second machining step. Thereafter, the machining tool on the tool spindle is replaced with the workpiece chuck hand 40.

Figure 8A:
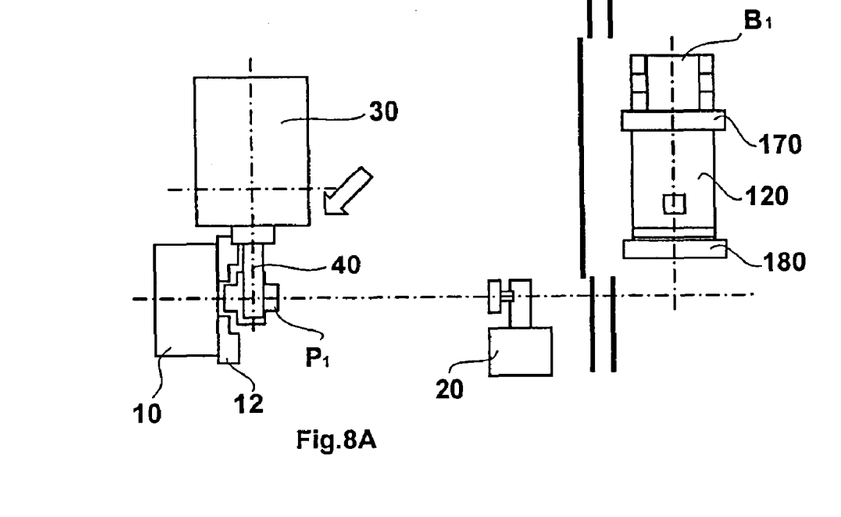
FIGS. 8A, 8B and 8C are explanatory views illustrating the operation of the workpiece carry-in/out device for a composite working lathe according to the present invention.
Figure 8B:
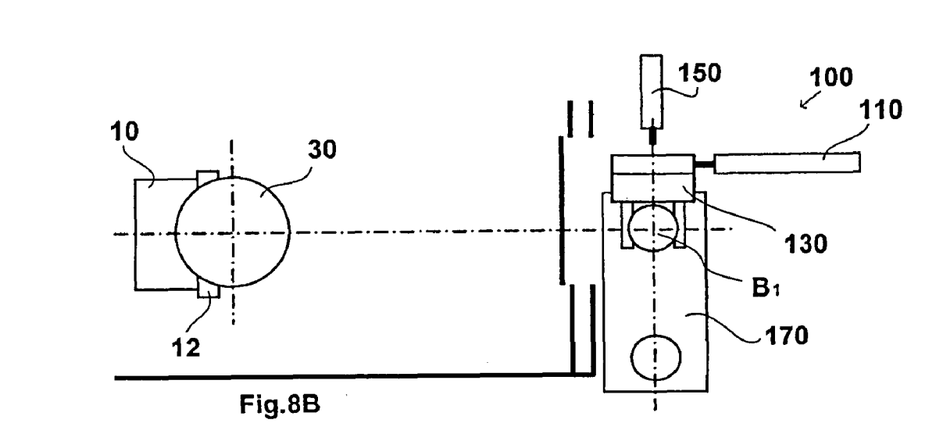
Figure 8C:
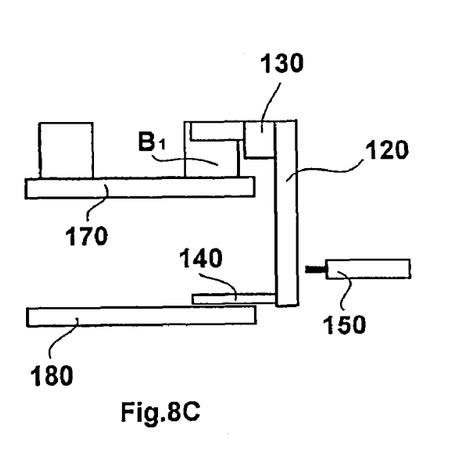

FIGS. 8A, 8B and 8C illustrate a step in which the tool spindle stock 30 is moved toward the main spindle 10, and the workpiece chuck hand 40 grips a finished product $P_1$. The chuck 12 is unclamped.

Figure 9A:
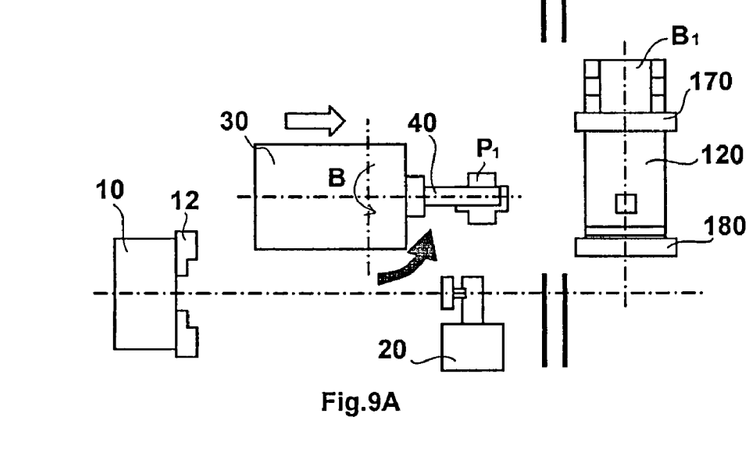
FIGS. 9A, 9B and 9C are explanatory views illustrating the operation of the workpiece carry-in/out device for a composite working lathe according to the present invention.
Figure 9B:
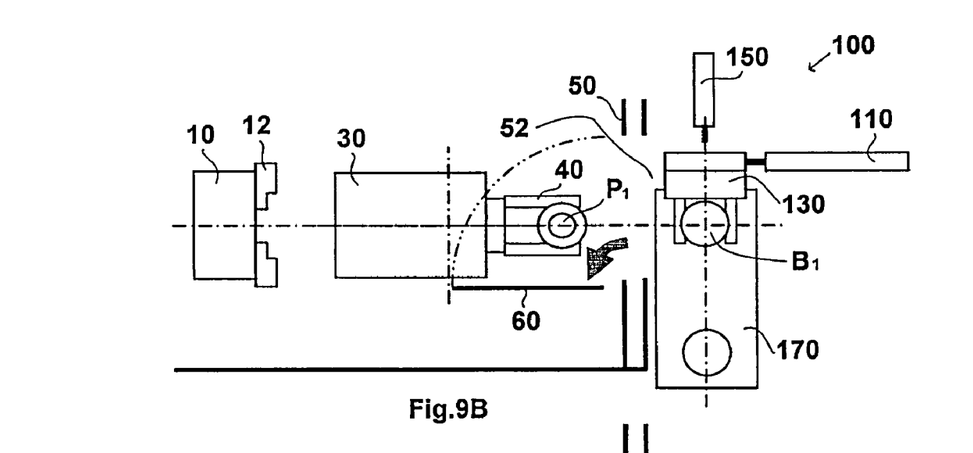
Figure 9C:
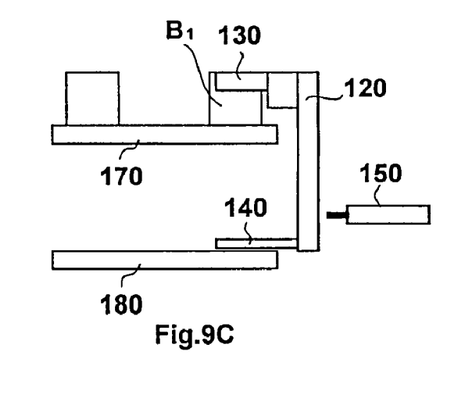

FIGS. 9A, 9B and 9C illustrate the step of carrying out the finished product $P_1$.

The tool spindle stock 30 is rotated for 90 degrees around a B axis.

The door 60 covering the opening 52 of the cover 50 is opened. The workpiece carry-in/out device 100 grips a material $B_1$ using a carry-in hand 130.

Figure 10A:
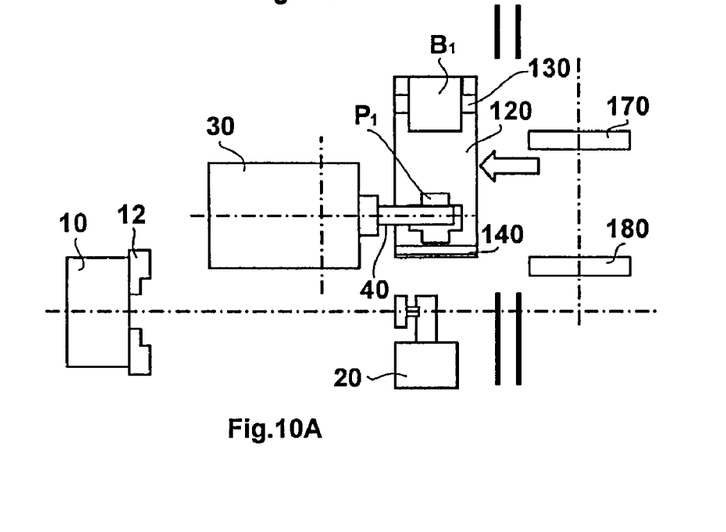
FIGS. 10A, 10B and 10C are explanatory views illustrating the operation of the workpiece carry-in/out device for a composite working lathe according to the present invention.
Figure 10B:
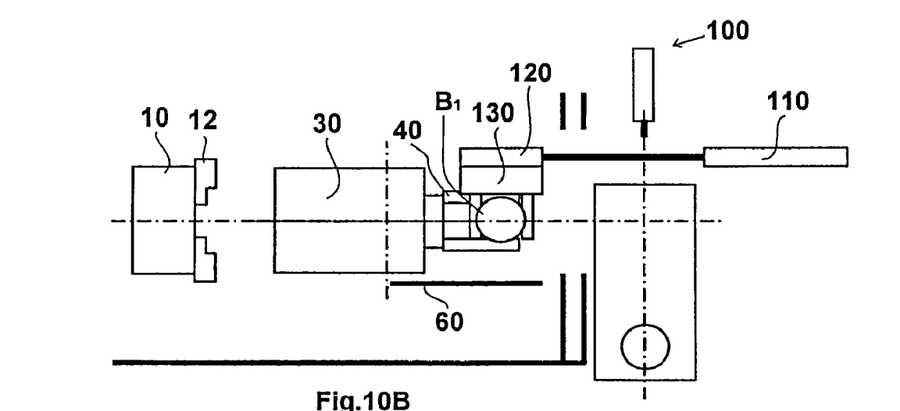
Figure 10C:
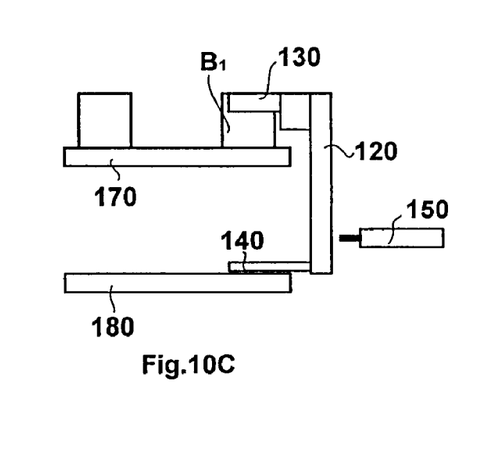

FIGS. 10A, 10B and 10C illustrate a step in which the cylinder 110 of the workpiece carry-in/out device 100 is extended so as to move the frame 120 to a position facing the workpiece chuck hand 40.

Figure 11A:
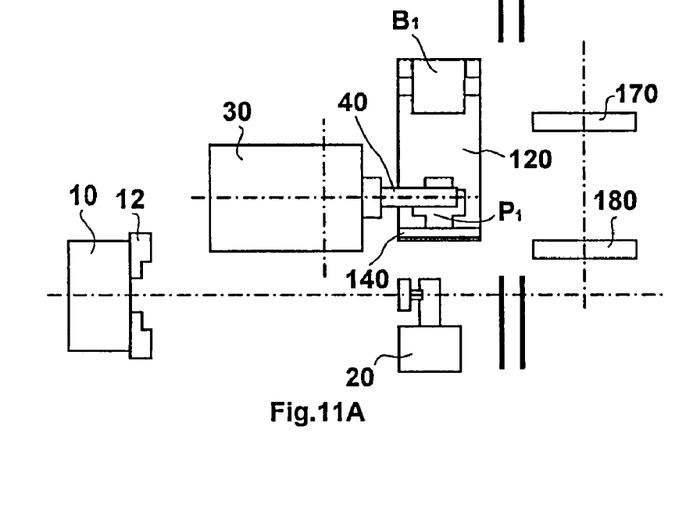
FIGS. 11A, 11B and 11C are explanatory views illustrating the operation of the workpiece carry-in/out device for a composite working lathe according to the present invention.
Figure 11B:
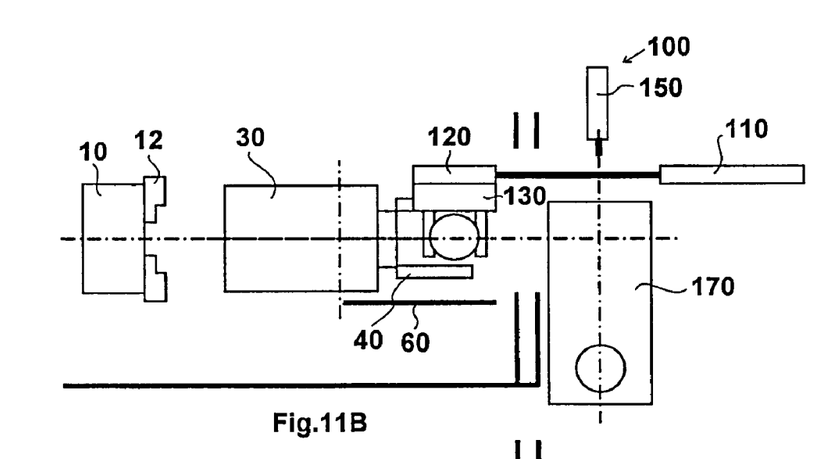
Figure 11C:
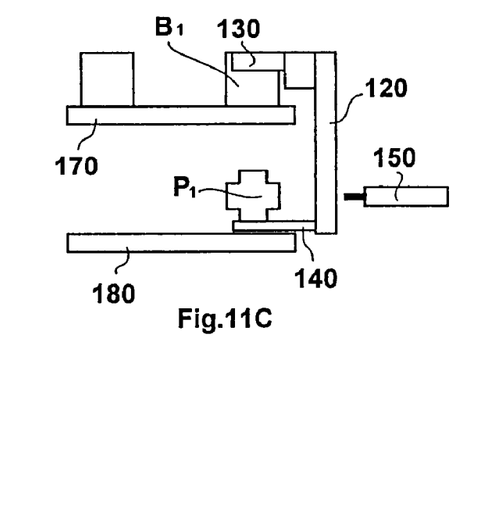

FIGS. 11A, 11B and 11C illustrate a step in which the workpiece chuck hand 40 unclamps the finished product $P_1$ on a carry-out tray 140.

Figure 12A:
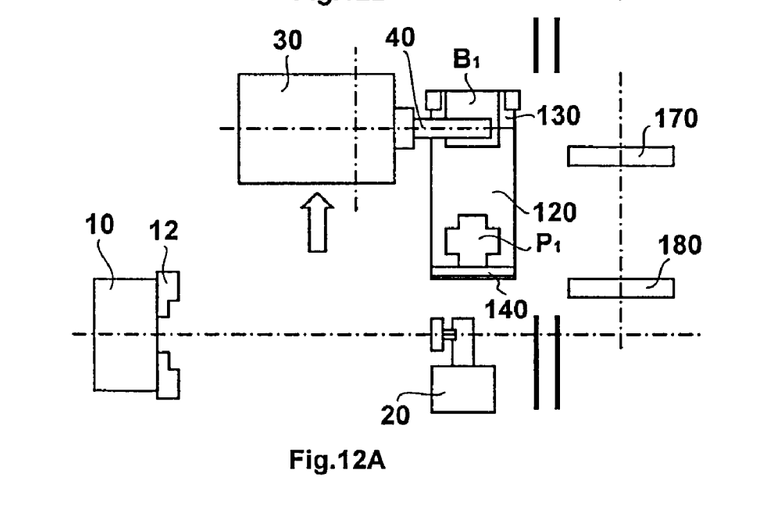
FIGS. 12A, 12B and 12C are explanatory views illustrating the operation of the workpiece carry-in/out device for a composite working lathe according to the present invention.
Figure 12B:
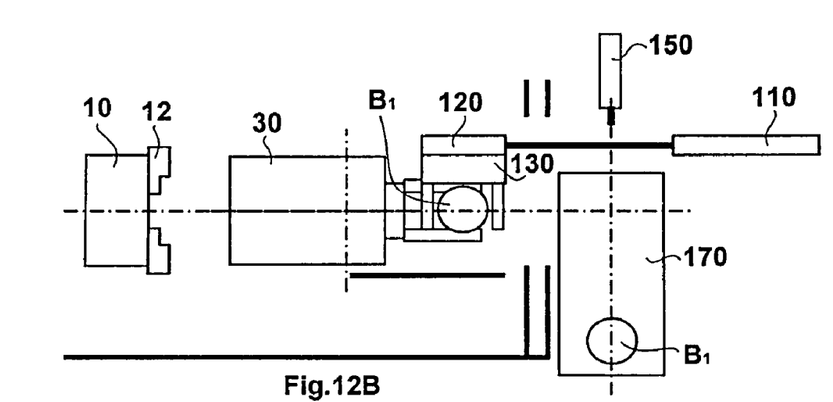
Figure 12C:
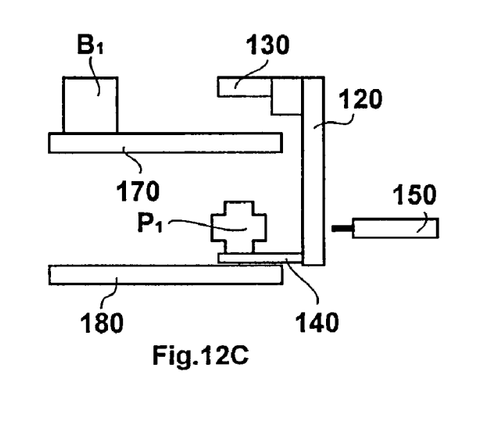

FIGS. 12A, 12B and 12C illustrate a step in which the tool spindle stock 30 is moved upward, and the workpiece chuck hand 40 clamps a material $B_1$, and then the carry-in hand 130 unclamps the material $B_1$.

Figure 13A:
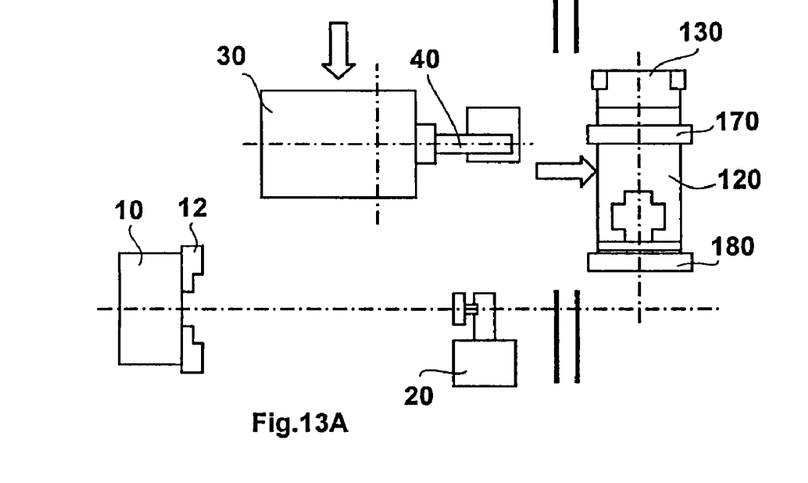
FIGS. 13A, 13B and 13C are explanatory views illustrating the operation of the workpiece carry-in/out device for a composite working lathe according to the present invention.
Figure 13B:
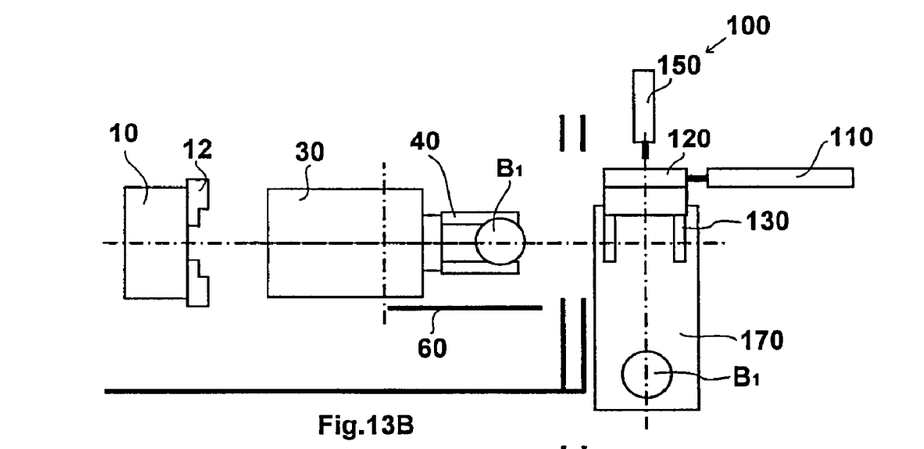
Figure 13C:
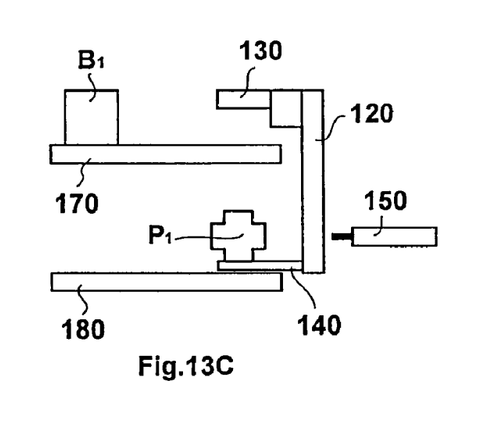

FIGS. 13A, 13B and 13C illustrate a step in which after moving the tool spindle stock 30 downward, the cylinder 110 is operated to draw out the frame to the exterior of the machine.

Figure 14A:
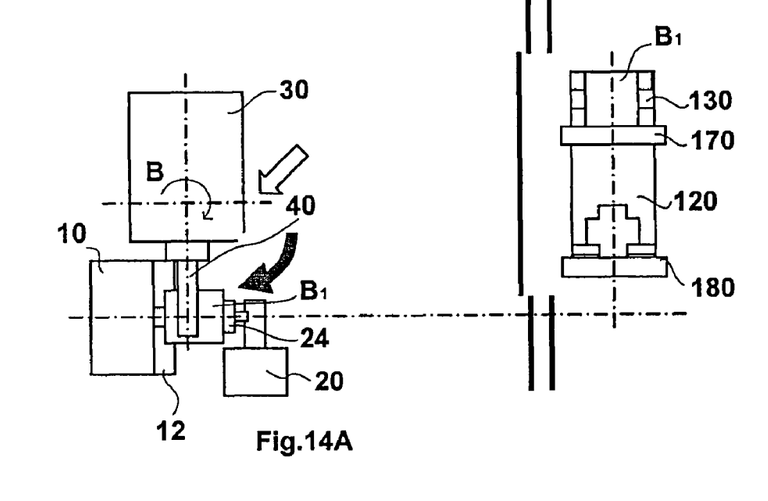
FIGS. 14A, 14B and 14C are explanatory views illustrating the operation of the workpiece carry-in/out device for a composite working lathe according to the present invention.
Figure 14B:
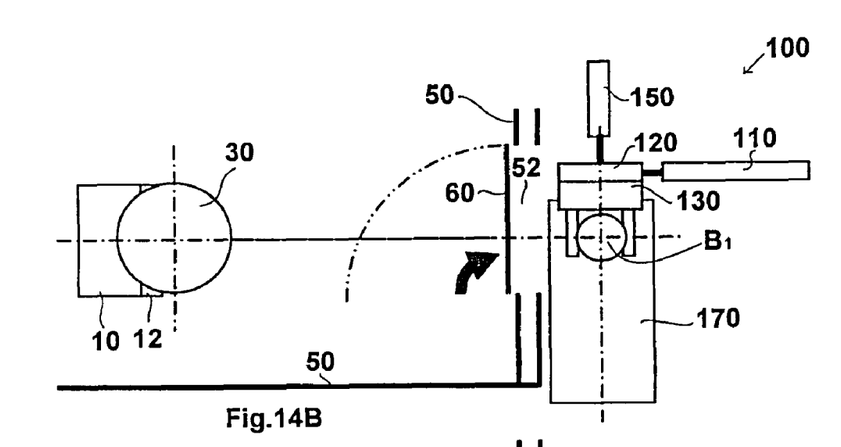
Figure 14C:
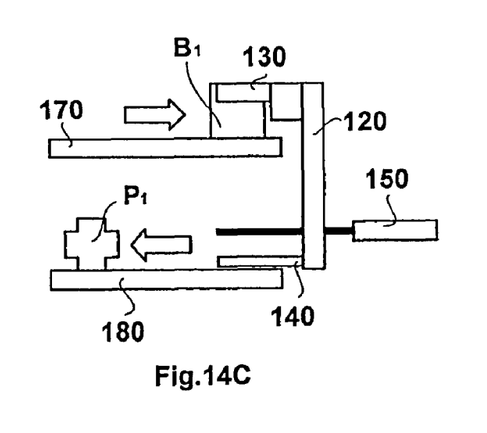

FIGS. 14A, 14B and 14C illustrate a step in which the door is rotated to close the opening 52 of the cover 50, and thereafter, the tool spindle stock 30 is rotated for 90 degrees around the B axis so as to have the material $B_1$ face the chuck 12, and then the workpiece handling device 20 is moved to press the material $B_1$ securely to the chuck 12 via the workpiece pressing device 24.

Further, the material conveyer 170 is operated to move the next material $B_1$ toward the carry-in hand 130.

A finished product pressing cylinder 150 is operated to press the finished product $P_1$ onto a finished product conveyer 180, and the finished product conveyer moves the finished product $P_1$.

The above-described steps are repeated to automatically process materials into finished products.

What is claimed is:

1. A workpiece carry-in/out device for a composite working lathe comprising a main spindle for gripping and rotating a workpiece, a tool spindle stock that moves along a Z axis parallel to the axis line of the main spindle and an X axis orthogonal to the Z axis and further rotates around a B axis perpendicular to a plane formed by the X axis and the Z axis, a tool magazine for supplying a machining tool and a workpiece chuck hand for gripping a workpiece to a tool spindle of the tool spindle stock in an exchangeable manner, and a cover for covering a machining area, wherein the workpiece carry-in/out device is disposed on an outer side of the cover on an opposite side from the main spindle of the composite working lathe, and the workpiece carry-in/out device comprises upper and lower conveyers, a frame having a carry-in hand for gripping a material and a carry-out tray for receiving a finished product, and a cylinder for moving the frame back and forth between the conveyer and the machining area.

2. A workpiece carry-in/out device for a composite working lathe comprising a main spindle for gripping and rotating a workpiece, a tool spindle stock that moves along a Z axis parallel to the axis line of the main spindle and an X axis orthogonal to the Z axis and further rotates around a B axis perpendicular to a plane formed by the X axis and the Z axis, a tool magazine for supplying a machining tool and a workpiece chuck hand for gripping a workpiece to a tool spindle of the tool spindle stock in an exchangeable manner, and a cover for covering a machining area, wherein the workpiece carry-in/out device is disposed on an outer side of the cover on an opposite side from the main spindle of the composite working lathe, and the tool spindle stock having the workpiece chuck hand attached thereto receives a workpiece having completed a first machining step from the chuck on the main spindle, reverses the workpiece and returns the same to the chuck on the main spindle.

3. The workpiece carry-in/out device for a composite working lathe according to claim 1, wherein the composite working lathe further comprises a workpiece handling device disposed below the tool spindle stock that moves along an axis parallel to the Z axis, and the workpiece handling device includes a workpiece pressing device for pressing the workpiece onto the chuck on the main spindle.

4. The workpiece carry-in/out device for a composite working lathe according to claim 1, further comprising a door for opening and closing an opening formed on a cover disposed between the composite working lathe and the workpiece carry-in/out device.

5. The workpiece carry-in/out device for a composite working lathe according to claim 1, wherein the tool spindle stock turns a center line of grip of the workpiece chuck hand toward a perpendicular direction by rotating around a B axis to receive material carried in via a carry-in hand and to carry out the finished product on a carry-out tray.

6. The workpiece carry-in/out device for a composite working lathe according to claim 1, further comprising a finished product push-out cylinder for pushing the finished product on the carry-out tray onto a finished product conveyer.

* * * * *